United States Patent
Kawaguchi et al.

(10) Patent No.: US 10,425,541 B2
(45) Date of Patent: Sep. 24, 2019

(54) PUSH SCANNING SYSTEM FOR DISPLAYING NOTIFICATIONS

(71) Applicant: BROTHER KOGYO KABUSHIKI KAISHA, Nagoya-shi, Aichi-ken (JP)

(72) Inventors: Masafumi Kawaguchi, Nagoya (JP); Ryo Yanagawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/938,138

(22) Filed: Mar. 28, 2018

(65) Prior Publication Data

US 2018/0288247 A1    Oct. 4, 2018

(30) Foreign Application Priority Data

Mar. 30, 2017  (JP) .................. 2017-067175

(51) Int. Cl.
*H04N 1/00*    (2006.01)
(52) U.S. Cl.
CPC ......... *H04N 1/00228* (2013.01); *H04N 1/001* (2013.01); *H04N 1/00395* (2013.01); *H04N 1/00477* (2013.01)
(58) Field of Classification Search
CPC ............... H04N 1/00228; H04N 1/001; H04N 1/00395; H04N 1/00477
See application file for complete search history.

(56) References Cited

U.S. PATENT DOCUMENTS

| | | | |
|---|---|---|---|
| 2010/0079797 | A1 | 4/2010 | Ohara |
| 2010/0321728 | A1* | 12/2010 | Shibao ............... H04N 1/00204 358/1.15 |
| 2013/0007665 | A1 | 1/2013 | Chaudhri et al. |

FOREIGN PATENT DOCUMENTS

| | | |
|---|---|---|
| JP | 2004-215009 A | 7/2004 |
| JP | 2010-081376 A | 4/2010 |
| JP | 2016-040716 A | 3/2016 |

\* cited by examiner

*Primary Examiner* — Eric A. Rust
(74) *Attorney, Agent, or Firm* — Scully, Scott, Murphy & Presser, PC

(57) ABSTRACT

An information processing apparatus includes: a display; an operation interface; a controller, which performs: acquiring image data, through the communication interface, image data, designation information, and specific information; displaying, a notification, a notification including the specific information, the notification indicating that the image data, the designation information and the specific information are acquired; and displaying, a result obtained by performing a processing of the image data designated by the designation information, in response to receiving an operation, displaying, a second notification together with a first notification, in a case where second image data, second designation information, and second specific information are acquired during displaying of the first notification indicating that a first image data, a first designation information and a first specific information are acquired, the second notification indicating that the second image data, the second designation information and the second specific information are acquired.

13 Claims, 15 Drawing Sheets

FIG. 2

| DATA NUMBER 101 | TIME 102 | MODEL 104 | ACTION 106 | STATUS 108 | PATH 110 | DISPLAY COLOR 112 | |
|---|---|---|---|---|---|---|---|
| 1 | 9:00 | ADS-AABB | OPENING FOLDER | SUCCESS | ￥￥aaa￥￥bbb | WHITE | M1 |
| 2 | 9:05 | ADS-BBCC | SENDING BY EMAIL | SUCCESS | ￥￥aaa￥￥ccc | BLACK | M2 |
| 3 | 9:10 | ADS-BBCC | OPENING FOLDER | FAIL | ￥￥aaa￥￥bbb | WHITE | M3 |
| 4 | 9:15 | ADS-AABB | SENDING BY EMAIL | SUCCESS | ￥￥aaa￥￥ccc | BLACK | M4 |

50

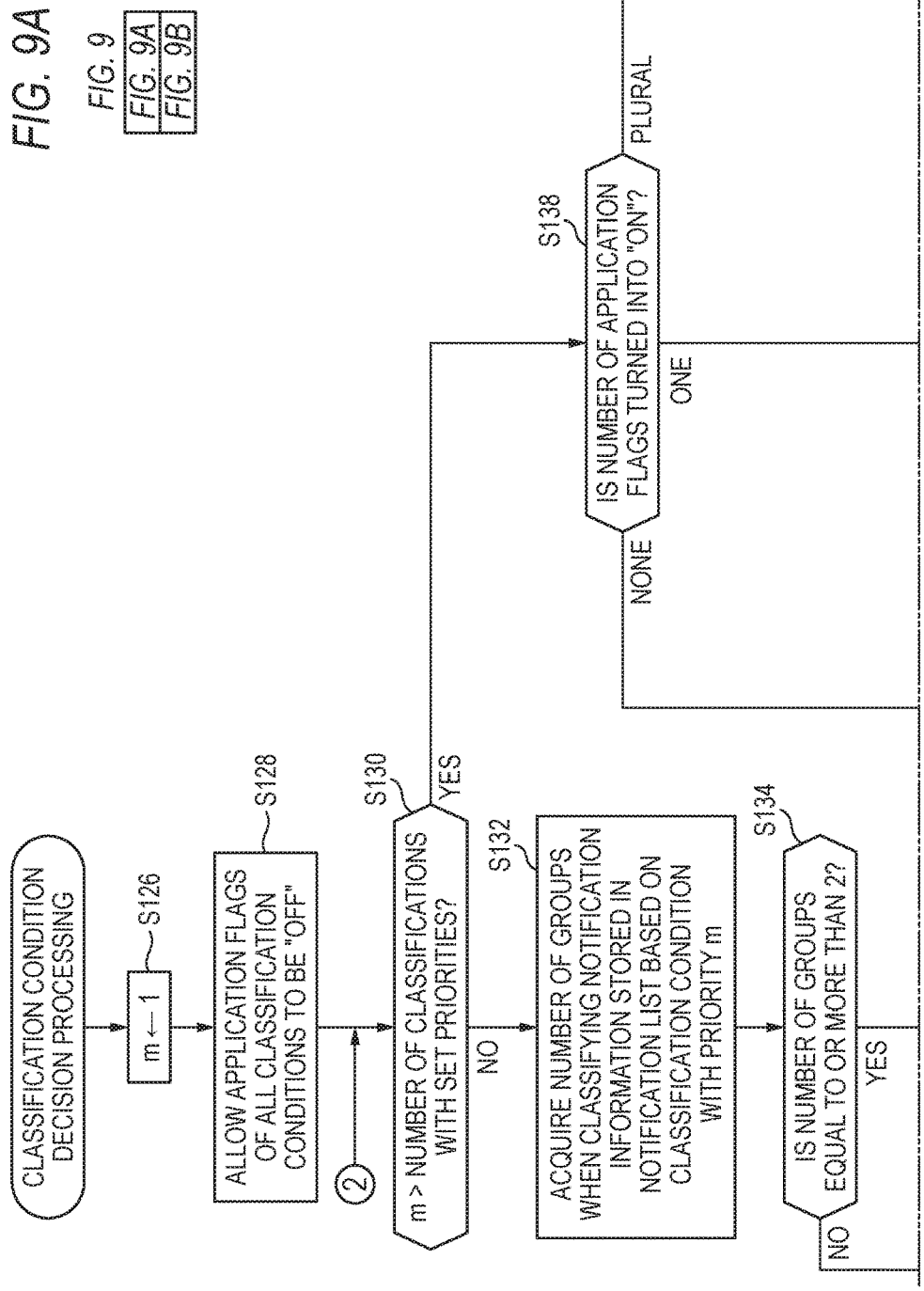

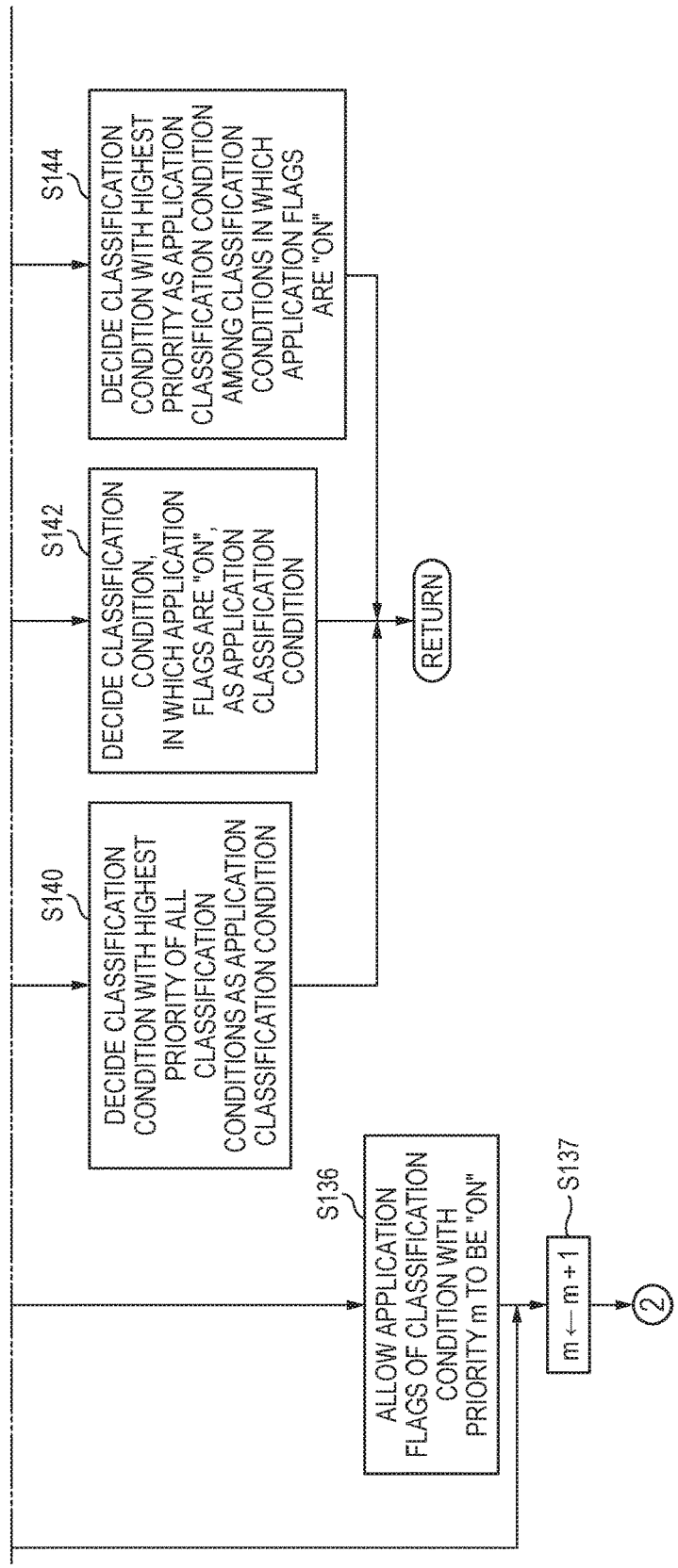

FIG. 12

| DATA NUMBER 301 | TIME 102 | MODEL 104 | ACTION 106 | STATUS 108 | PATH 110 | DISPLAY COLOR 112 | |
|---|---|---|---|---|---|---|---|
| 1 | 9:00 | ADS-AABB | OPENING FOLDER | SUCCESS | ￥￥aaa￥bbb | WHITE | — M1 |
| 2 | 9:15 | ADS-AABB | SENDING BY EMAIL | SUCCESS | ￥￥aaa￥ccc | BLACK | — M4 |
| 3 | 9:05 | ADS-BBCC | SENDING BY EMAIL | SUCCESS | ￥￥aaa￥ccc | BLACK | — M2 |
| 4 | 9:10 | ADS-BBCC | OPENING FOLDER | FAIL | ￥￥aaa￥bbb | WHITE | — M3 |

300

PUSH SCANNING SYSTEM FOR DISPLAYING NOTIFICATIONS

CROSS-REFERENCE TO RELATED APPLICATION

This application claims priority from Japanese Patent Application No. 2017-067175 filed on Mar. 30, 2017, the entire subject matter of which is incorporated herein by reference.

TECHNICAL FIELD

This disclosure relates to a non-transitory computer-readable storage medium having instructions and an information processing apparatus, by which a user can easily know a correspondence between push scanning instructed by the user and an execution result of the push scanning when a push scanning function of an image reading apparatus is used a plurality of times.

BACKGROUND

There has been known a system that exchanges image data and the like between an information processing apparatus and an image reading apparatus connected to a LAN. The background art discloses push scanning in which when a user instructs the image reading apparatus to perform scanning, image data generated when the image reading apparatus scans a document is transmitted to the information processing apparatus on a designated LAN. In the information processing apparatus receiving the image data by the push scanning, a result obtained by processing the image data with an automatically designated application is displayed on a display without operating the information processing apparatus by the user.

SUMMARY

However, in the aforementioned related art, when the push scanning is performed a plurality of times, the display of the information processing apparatus displays a plurality of results obtained by processing the image data with the application. Therefore, since the user has a difficulty in determining which instruction leads the results displayed on the display according to the push scanning, it cannot be said that user's usability is always good.

This disclosure is to allow a user to be able to easily know a correspondence between push scanning instructed by the user and an execution result of the push scanning when a push scanning function of an image reading apparatus is used a plurality of times.

A non-transitory computer-readable storage medium of this disclosure has instructions executable by a computer of an information processing apparatus including a memory, a display, an operation interface, and a communication interface communicable with an image reading apparatus having a push scanning function. The instructions, when executed by the computer, cause the information processing apparatus to perform: acquiring, through the communication interface, image data, which is read by the image reading apparatus, designation information for designating a processing of the image data, and specific information for specifying an instruction causing the image reading apparatus to perform push scanning; displaying, on the display, a notification including the specific information, the notification indicating that the image data, the designation information and the specific information are acquired by the acquiring the designation information; and displaying, on the display, a result obtained by performing a processing of the image data designated by the designation information, in response to receiving an operation to the notification via the operation interface, displaying, on the display, a second notification together with a first notification, in a case where second image data, second designation information, and second specific information are acquired during displaying of the first notification indicating that a first image data, a first designation information and a first specific information are acquired, the second notification indicating that the second image data, the second designation information and the second specific information are acquired.

According to the aforementioned configuration, when the push scanning is performed a plurality of times, notifications including the specific information are displayed by the number of times of execution. Moreover, the user operates a certain notification, so that a result (an execution result of the push scanning) obtained by performing a processing designated by the designation information is displayed with respect to image data read by the push scanning. Accordingly, the user can recognize a notification when executing certain push scanning and then operate the notification, thereby easily knowing the correspondence between push scanning instructed to be executed by the user and the execution result of the push scanning.

An information processing apparatus of this disclosure includes: a display; an operation interface a communication interface communicable with an image reading apparatus having a push scanning function; and a controller, which performs: acquiring image data, through the communication interface, image data, which is read by the image reading apparatus, designation information for designating a processing of the image data, and specific information for specifying an instruction causing the image reading apparatus to perform push scanning; displaying, on the display, a notification, a notification including the specific information, the notification indicating that the image data, the designation information and the specific information are acquired by the acquiring the designation information; and displaying, on the display, a result obtained by performing a processing of the image data designated by the designation information, in response to receiving an operation to the notification via the operation interface, displaying, on the display, a second notification together with a first notification, in a case where second image data, second designation information and second specific information are acquired during displaying of the first notification indicating that a first image data, a first designation information and a first specific information are acquired, the second notification indicating that the second image data, the second designation information and the second specific information are acquired.

BRIEF DESCRIPTION OF THE DRAWINGS

The foregoing and additional features and characteristics of this disclosure will become more apparent from the following detailed descriptions considered with the reference to the accompanying drawings, wherein:

FIG. 2 is an example of a notification list;

FIGS. 9A and 9B are an example of a classification condition decision processing;

FIG. 12 is an example of a display list;

DETAILED DESCRIPTION

System Configuration of Present Embodiment

Hereinafter, an embodiment of this disclosure will be appropriately described with reference to the drawings. The embodiment to be described below is merely one example and it goes without saying that the embodiment of this disclosure can be appropriately modified within the scope of this disclosure. For example, an execution order of each processing to be described later can be appropriately modified within the scope of this disclosure.

Figure 1:
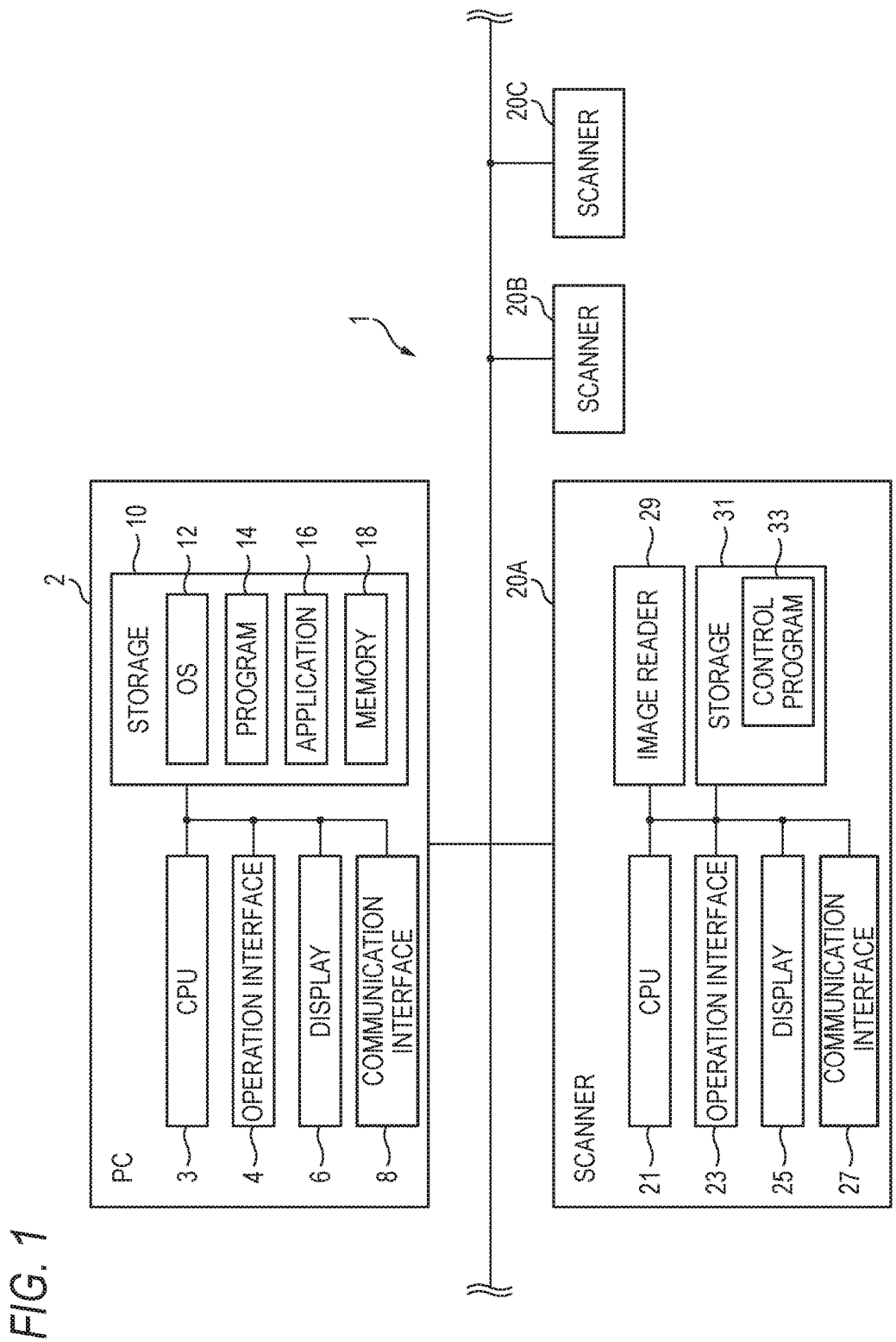
FIG. 1 is a schematic diagram of an image reading system according to an embodiment.

With reference to FIG. 1, the outline of an image reading system 1 will be described. In the image reading system 1, a plurality of scanners 20A, 20B, and 20C and one PC 2 are communicably connected to each other by a LAN 15. In the present embodiment, the image reading system 1 has the three scanners 20A, 20B, and 20C; however, the image reading system may have three or less scanners or three or more scanners and may be a multifunctional peripheral having functions of a copy machine, a FAX and the like in addition to the scanner functions, instead of the scanners. Furthermore, the image reading system 1 has one PC 2; however, the image reading system 1 may have two or more PCs.

Hereinafter, when the three scanners 20A, 20B, and 20C are not needed to be distinguished from one another, they are written as the scanner 20.

Block Diagram of Scanner 20

The scanner 20 mainly includes a CPU 21, an operation interface 23, a display 25, a communication interface 27, an image reader 29, and a storage 31. FIG. 1 illustrates only the scanner 20A in detail and does not illustrate the scanners 20B and 20C in detail; however, the scanners 20B and 20C have a configuration similar to that of the scanner 20A.

Respective elements constituting the scanner 20 are connected to one another.

The CPU 21 is connected to the operation interface 23, the display 25, the communication interface 27, the image reader 29, and the storage 31. The CPU 21 executes a control program 33 stored in the storage 31 based on various types of information outputted from the operation interface 23 and various types of information and the like acquired from a communication apparatus through the communication interface 27, thereby controlling the scanner 20.

The operation interface 23 includes a plurality of operation buttons to be operated by a user and transmits a signal depending on a pressing operation of the user to the CPU 21. The user can operate the operation interface 23, thereby inputting desired instructions.

The display 25 includes a display such as a LCD. The display 25 displays various types of information on the display according to instructions from the CPU 21.

The communication interface 27 includes an interface for connecting to a network such as the LAN 15.

The image reader 29 includes so-called a flat bed type document table or an ADP (abbreviation of Auto Document Feeder) type document table, and a well-known reading mechanism, and when a reading instruction is inputted from the user via the operation interface 23, the reading mechanism is controlled by the CPU 21, so that a document can be read.

The storage 31 is configured by a flash memory and the like and stores the control program 33 and a model name and the like of the scanner 20. The control program 33, for example, may be downloaded from a server connected via the Internet or may be recorded on a CD-ROM and the like.

The control program 33 stored in the storage 31 is executed by the CPU 21. However, in the present specification, program names will be omitted and operations of each program will be described. That is, in the following description, description that "the CPU 21 performs a processing A" may represent that "the CPU 21 performs the processing A described in a program A".

Block Diagram of PC 2

The PC 2 mainly includes a CPU 3, an operation interface 4, a display 6, a communication interface 8, and a storage 10.

Respective elements constituting the PC 2 are connected to one another.

The CPU 3 controls an entire operation of the PC 2. The CPU 3 executes a program 14 stored in the storage 10 based on various types of information outputted from the operation interface and various types of information and the like acquired from an external communication apparatus through the communication interface 8, thereby controlling the PC 2.

The operation interface 4 includes a mouse and a keyboard to be operated by a user and is a device that transmits a signal depending on an operation of the user to the CPU 3. The user can operate the operation interface 4, thereby inputting desired instructions.

The display 6 is a device including a display such as a LCD. The display 6 displays various types of information on the display according to instructions from the CPU 3.

The communication interface 8 includes an interface for connecting to a network such as the LAN 15 and the Internet, and an interface for connecting to an external storage device such as a USB memory.

The storage 10 is configured with a RAM, a ROM, a flash memory, a HDD and the like as an example. The storage 10 has an operating system (OS) 12, the program 14, an application 16, and a memory 18. The program 14, which will be described in detail later, is a program describing a processing of receiving image data (hereinafter, referred to as scan data) received from the scanner 20 and obtained by reading a document and displaying a notification N on the display 6 in the case of using a push scanning function of the scanner 20. The application 16 is an application which is executed by the CPU 3 by an action 106 (which will be described later) designated by the user in the case of using the push scanning function, and includes an application (abbreviated to an "application for OCR") having an OCR function for converting the image data into character data, an application (abbreviated to an "application for Image") having a function for editing the image data, and an application (abbreviated to an "application for Mail") having a function for attaching the scan data to an email and transmitting the email. The application 16 is not limited to the aforementioned application. The memory 18 stores data or information (which will be described in detail later, but for example, a notification list 50 (FIG. 2) and the like) necessary for executing the application 16. The OS 12 is a program for providing a function of allowing the display 6 to display various images and a basic function tope used in the program 14 and the application 16. Furthermore, the OS 12 is also a program for providing an API (abbreviation of Application Programming Interface) for allowing the program 14 and the application 16 to give instructions to various types of hardware. The application 16 can be installed in the image reading system 1 by an operator and the like for the purpose of use. The program 14 acquires data and the like, but the data acquisition of the program 14, for example, may represent a processing of receiving data outputted from the OS 12. The program 14 may be provided by a header of the scanner 20 or may be provided as a part of the OS 12.

In the present embodiment, a user inputs scanning setting including the action 106 and designation of a transmission destination via the operation interface 23 of the scantier 20, and then presses a push scanning start button (not illustrated). The CPU 21 of the scanner 20 reads a document by the image reader 29 in response to the pressing of the push scanning start button, thereby generating scan data. The CPU 21 transmits the generated scan data to the PC 2. When the scan data is received, the CPU 3 of the PC 2 holds the scan data in a predetermined folder of the memory IS and displays the notification N on the display 6 to inform the reception of the scan data. When the user operates the notification N, the CPU 3 executes the action 106 with respect to the held scan data.

In the present specification, the "action" represents that the CPU 3 processings the scan data held in the memory 18 by various methods. In a specific example, in the present embodiment, three of "opening folder", "sending by email", and "opening with application" are prepared as the action 106. If the action 106 is executed, when the "opening folder" is designated as an execution result, the CPU 3 displays a screen on the display 6, the screen opening the predetermined folder holding the scan data. When the "sending by email" is designated, the scan data is attached to an email by the application for Mail and a screen, on which a transmission destination, via the operation interface 4, a body and the like of an email can be inputted. is displayed on the display 6. When the "opening with application" is designated, a result obtained by processing the scan data with the application for OCR or the application for image is displayed on the display 6.

In the present specification, the "data" is a bit or a bit sequence which can be handled by a computer, and represents that the computer handles semantic content indicated by each bit without consideration. The "information" represents semantic content indicated by each bit or a bit sequence.

In addition, even though a format (for example, a text format, a binary format, a flag format and the like) has been changed for each computer, the "data" and the "information" are handled as the same data and information as long as they are recognized as the same semantic content. For example, information indicating "two" may be held as data of a text format of "0x32" with an ASCII code in a certain computer or data of a binary format of "10" with binary notation in another computer.

However, distinguishing of the aforementioned "data" and "information" is not strict and exceptional handling is also permitted. For example, data may be temporarily handled as information or information may be temporarily handled as data. Furthermore, each one handled as data in a certain apparatus may be handled as information in another apparatus. Moreover, information may be taken out from data or data may be taken out from information.

Notification List 50

In the present embodiment, a description will be provided as an example for the case where push scanning is performed four times. The display 6 of the PC 2 displays a notification N1 based on notification information M1 received by performing first push scanning, a notification N2 based on notification information M2 received by performing second push scanning, a notification N3 based on notification information M3 received by performing third push scanning, and a notification N4 based on notification information M4 received by performing fourth push scanning. Hereinafter, when the notification information M1, the notification information M2, the notification information M3, and the notification information M4 are not needed to be distinguished from one another, they are written as notification information M. Furthermore, when the notification N1, the notification N2, the notification N3, and the notification N4 are not needed to be distinguished from one another, they are written as notification N.

With reference to FIG. 2, a configuration of a database to be used to manage and display the notification information M will be described.

When a user sends a push scanning start instruction to the scanner 20, the CPU 21 transmits the scan data, a time 102, a model 104, the action 106, and a status 108 to the PC 2. The CPU 3 adds a path 110 and a display color 112 to the information except for the scan data, and stores the information in the notification list 50 as the notification information M. That is, in the present embodiment, the notification information M indicates the time 102, the model 104, the action 106, the status 108, the path 110, and the display color 112.

A data number 101 is a number added in order to uniquely specify the notification information M in the notification list 50. The CPU 3 applies a value incremented from 1 whenever the notification information M is stored in the notification list 50.

In the present embodiment, the time 102 is information indicating a time at which the start of the push scanning has been instructed, but may be an image reading end time.

The model 104 is information indicating a model name of the scanner 20 having performed the scanning.

The action 106 is information indicating an action 106 designated by a user before the push scanning is performed.

The status 108 is information indicating an error state when succeeding in the scanning or failing in the scanning.

The path 110 is information indicating a path of a predetermined folder in which the CPU 3 holds the scan data.

The display color 112 is information indicating a display color of the notification N, which is applied by the CPU 3 of the PC 2, based on a display color classification condition (which will be described later).

The notification list 50 stores all the notification informant M, and a notification display processing is performed using the notification information M stored in the notification list 50 (which will be described later). The notification information M is deleted from the notification list 50 by executing the action 106 or selecting a closing button 103 included in the notification N.

Display Example of Display 6 of PC 2

Figure 3:
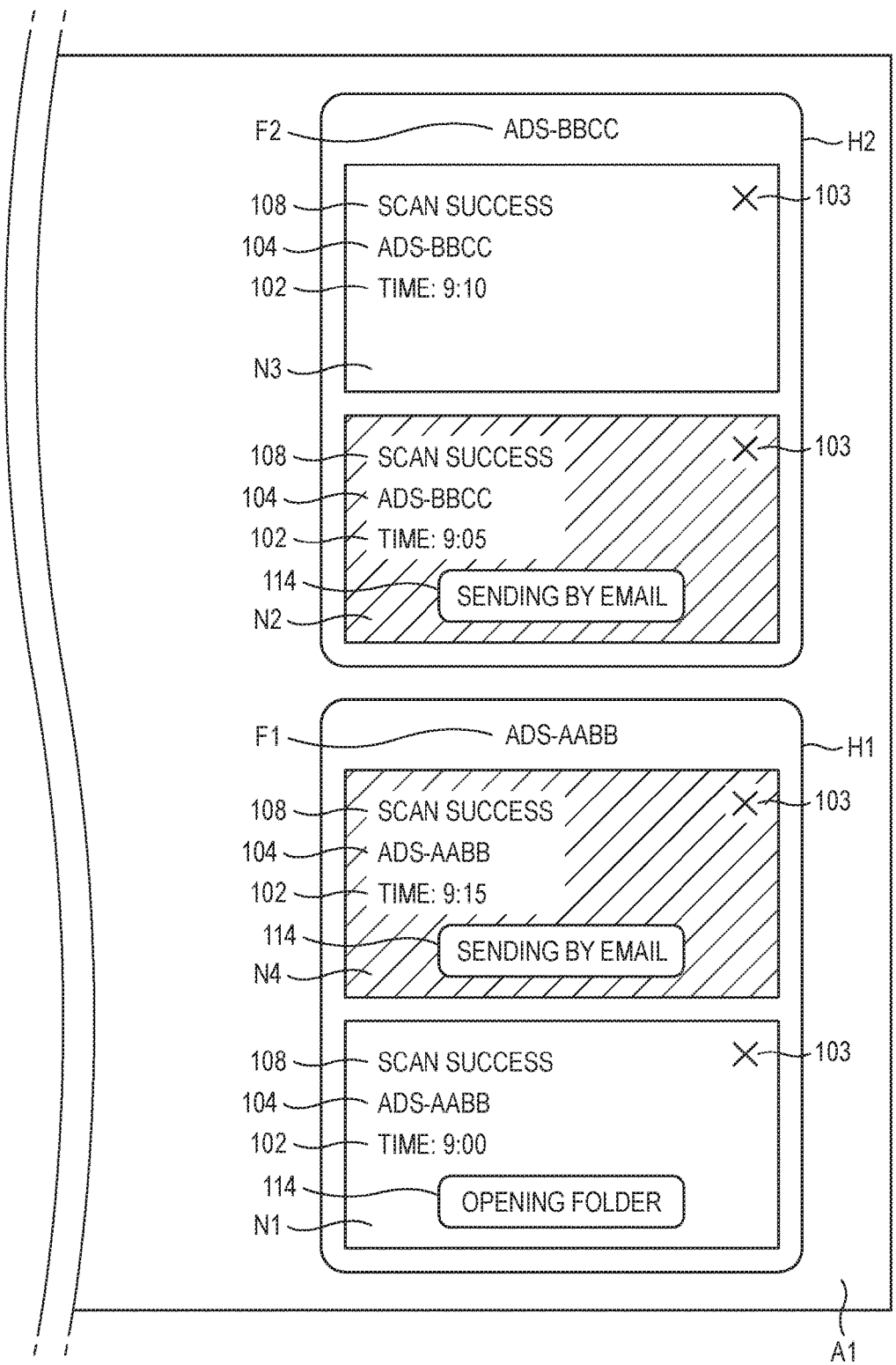
FIG. 3 is an example of a notification displayed on a display of a PC.

When the push scanning is performed, a display screen illustrated in FIG. 3 is displayed on the display 6 of the PC 2. The display screen includes a notification display area A1. The CPU 3 of the PC 2 displays the notification N in the notification display area A1 by the program 14 based on the received notification information M. On the notification N, the scan data the time 102, the closing button 103, the model 104, the status 108, and an execution button 114 are displayed. When a user selects the closing button 103, the notification N is deleted from the display 6 and the notification information M corresponding to the selected closing button 103 is deleted from the notification list 50. In a display area of the execution button 114, the action 106 to be performed on the scan data is displayed. When the user selects the execution button 114, the CPU 3 displays, on the display 6, a result obtained by executing the action 106 with respect to the scan data held in the folder indicated by the path information 110. When failing in the scanning, the execution button 114 is not displayed.

In the present embodiment, notifications having the same number as the number of times, by which the push scanning has been performed, are displayed. Hereinafter, a description will be provided for a display example when the push scanning is performed four times, the notification information M1, M2, M3, and M4 illustrated in FIG. 2 is received, and the "model" is set in the classification condition (which will be described later). When a model 104 corresponding to the notifications N1 and N4 is "ADS-AABB" and a model 104 corresponding to the notifications N2 and N3 is "ADS-BBCC", the notification N is classified into two groups. On the display 6 of the CPU 3, a group name F1 "ADS-AABB" for identifying the classified groups and the notifications N1 and N2 are vertically displayed side-by-side in an image H1 indicating the same group. Furthermore, a group name F2 "ADS-BBCC" and the notifications N2 and N3 classified to the same group are vertically displayed side-by-side in an image H2. Hereinafter, when the group names F1 and F2 are not needed to be distinguished from each other, they are written as a group name F.

Figure 4:
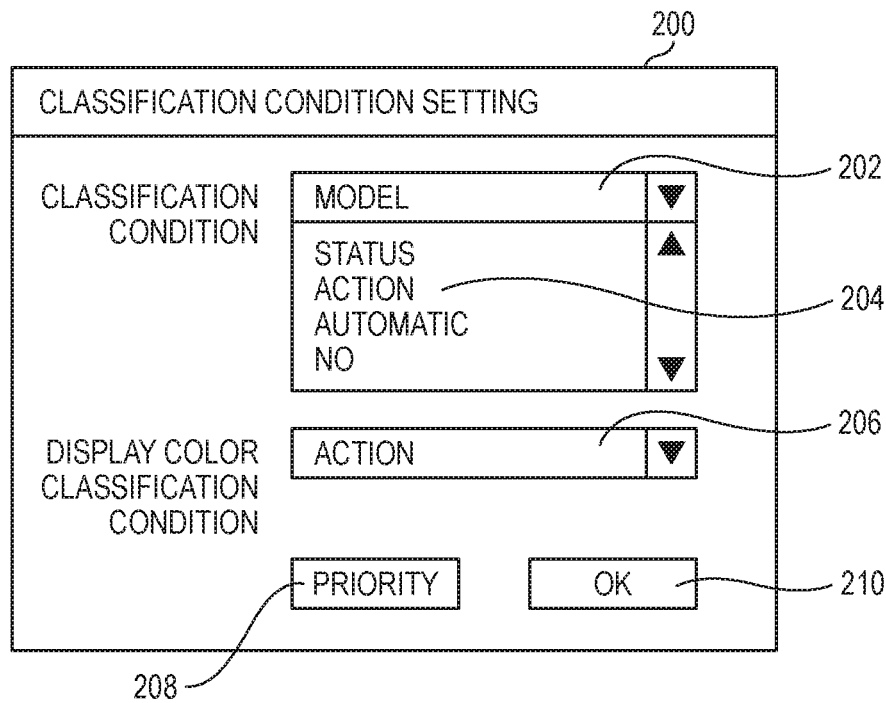
FIG. 4 is an example of a classification condition setting screen.

When a predetermined operation (for example, right clicking of the mouse) is performed on the notification N via the operation interface 4, the CPU 3 displays a classification condition setting screen 200 illustrated in FIG. 4. The classification condition setting screen 200 includes a classification condition box 202, a display color classification condition box 206, a priority setting button 208, and an OK button 210. When a user selects a lower arrow button of the classification condition box 202, the CPU 3 determines a change in the setting of the classification condition from the user and displays a selection candidate of the classification condition in a list box 204. The classification condition can be selected from five of "model", "status", "action", "automatic", and "no", When the "model" is set in the classification condition box 202, the CPU 3 determines that the "model" is set in the classification condition and classifies the notification information M with the model 104. Similarly, when the "status" is set in the classification condition box 202, the CPU 3 classifies the notification information M with the status 108, and when the "action" is set, the CPU 3 classifies the notification information M with the action 106. When the "no" is set in the classification condition box 202, the CPU 3 performs no classification and displays the notification information Min the sequence of the time 102. When the "automatic" is set, the CPU 3 automatically decides the classification condition based on a priority set in the priority setting screen 220, which will be described later.

The display color classification condition box 206 is similar to the classification condition box 202. When the OK button 210 is selected, selected classification condition and display color classification condition are set and the classification condition setting screen is closed. When the priority setting button 208 is selected, the CPU 3 displays a priority setting screen 220 illustrated in FIG. 5. On the priority setting screen 220, classification condition priority boxes 222, 224, and 226 are provided for each classification condition. The classification condition priority boxes 222, 224, and 226 are respectively provided at the lateral side thereof with priority display fields 228, 230, and 232, and priorities are provided in correspondence with each classification condition. As a number is small, it represents that a priority is high. A predetermined operation (for example, dragging of the mouse) is performed for the classification condition priority boxes 222, 224, and 226 via the operation interface 4, so that an order is changed and thus a priority corresponding to each classification condition can be designated. When an OK button 234 is selected, the screen returns to the classification condition setting screen 200.

A processing of accepting designation of the classification condition in the classification condition setting screen 200 is an example of a first acceptance processing. Furthermore, a processing of accepting designation of the display color classification condition in the classification condition setting screen 200 is au example of a third acceptance processing. Furthermore, a processing of accepting designation of priorities of a plurality of classification conditions in the priority setting screen 220 is an example of a second acceptance processing.

Operation of PC 2 by Program 14

Next, the operation of the PC 2 according to the present embodiment will be described using flowcharts from FIG. 6 to FIG. 11. When the PC 2 is powered on, the CPU 3 starts a PC main processing (FIG. 6) described in the program 14.

When a user, via the operation interface 23, inputs scanning setting including the action 106 and designation of a data transmission destination to the scanner 20 and then presses the push scanning start button (not illustrated), the CPU 21 of the scanner 20 reads a document by the image reader 29 in response to the pressing of the push scanning start button, thereby generating scan data. Thereafter, the CPU 21 transmits the scan data, the time 102, the model 104, the action 106, and the status 108 to the PC 2. The CPU 3 of the PC 2 receives these types of information (S100) and proceeds to a notification display processing illustrated in FIG. 7 (S102). When falling in the scanning, the scan data is not included in the information received in S100.

In S104, the CPU 3 stores the information received in S100 in the notification list 50. More specifically, the CPU 3 holds the scan data received in S100 in a predetermined folder. The CPU 3 applies the path 110 of the folder holding the scan data to the information received in S100 and excluding the scan data, and stores the information in the notification list 50 as the notification information M4.

In S106, the CPU 3 adds display color 112 to the notification information M according to the display color classification condition set on the classification condition setting screen 200. For example, a description will be provided for the case where the "action" is set in the display color classification condition and the notification list 50 is the content illustrated in FIG. 2. When the notification information M1, M2, M3, and M4 is grouped based cm the action 106, they are classified into two groups of the "opening folder" and the "sending by email". Then, a display color is correlated with each group, and the display color 112 is added to the notification information M4 based on the correspondence relation. When the number of groups increases, display colors corresponding to each action 106 are added such that there is no same color.

In S108, the CPU 3 determines the set classification condition. When there is the classification condition, that is, when it is determined that any one of the "model", the "status", and the "action" is set in the classification condition (S108: Yes), the CPU 3 proceeds to a first display list creation processing illustrated in FIG. 8 (S110).

In the present embodiment, a display list 300 is used in order to display the notification N displaying the reception of the notification information M on the display 6 of the PC 2. In each element of the display list 300, the notification information M stored in the notification list 50 is classified according to the classification condition for storage. Based on the notification information M stored in the display list 300, the notifications N are displayed side-by-side for each group on the display 6 of the PC 2. The display of the notification N by the use of the display list 300 will be described in S170.

In the first display list creation processing, a processing is performed such that the notification information M stored in the notification list 50 is stored in the display list 300.

In S112, the CPU 3 puts 1 into a counter "j". The counter "j" represents a data number 301 of the display list 300 and is used in order to indicate elements of the display list 300.

In S114, the CPU 3 determines whether the notification information M has been stored in a j-th element of the display list 300. In the case of positive determination (S114: Yes), the CPU 3 proceeds to S116.

In S116, the CPU 3 determines whether the notification information M received in S100 and the notification information M stored in the j-th element of the display list 300 are classified to the same group by comparing the two types of notification information M with each other based on the classification condition. For example, when the "model" has been set in the classification condition, the CPU 3 determines whether the model 104 of the notification information M stored in the display list 300 coincides with the model 104 of the notification information M received in S100 by comparing the two types of notification information M with each other. When the two models 104 coincide with each other, the CPU 3 determines that the two types of notification information M is classified to the same group (S116: Yes), and when the two models 104 are different from each other, the CPU 3 determines that the two types of notification information M is not classified to the same group (S116: No).

In the case of negative determination in S116 (S116: No), the CPU 3 increments the counter "j" (S120) and returns to S114. In the case of positive determination in S116 (S116: Yes), the CPU 3 proceeds to S118.

In S118, the CPU 3 inserts the notification information M into a (j+1)-th element of the display list 300. For example, when the "model" has been set in the classification condition and the notification information M4 of the notification list 50 illustrated in FIG. 2 is received, the notification information M4 is inserted between the notification information M1 and the notification information M2 and the notification information M is stored in the display list 300 in an order illustrated in FIG. 12. Then, the first display list creation processing is ended.

On the other hand, in the case of negative determination in S114 (S114: No), the CPU 3 proceeds to S122.

Figure 7:
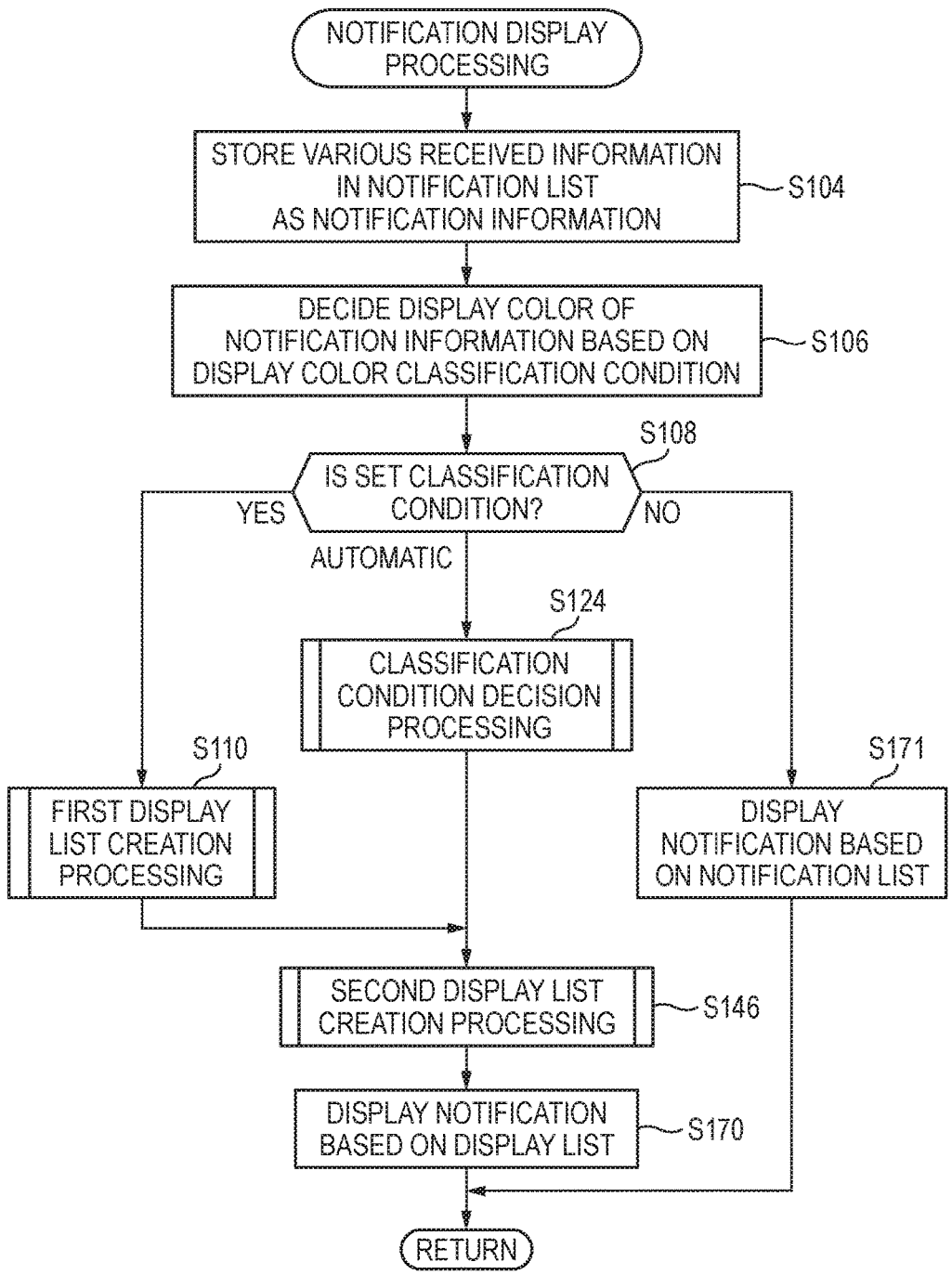
FIG. 7 is an example of a notification display processing.
Figure 8:
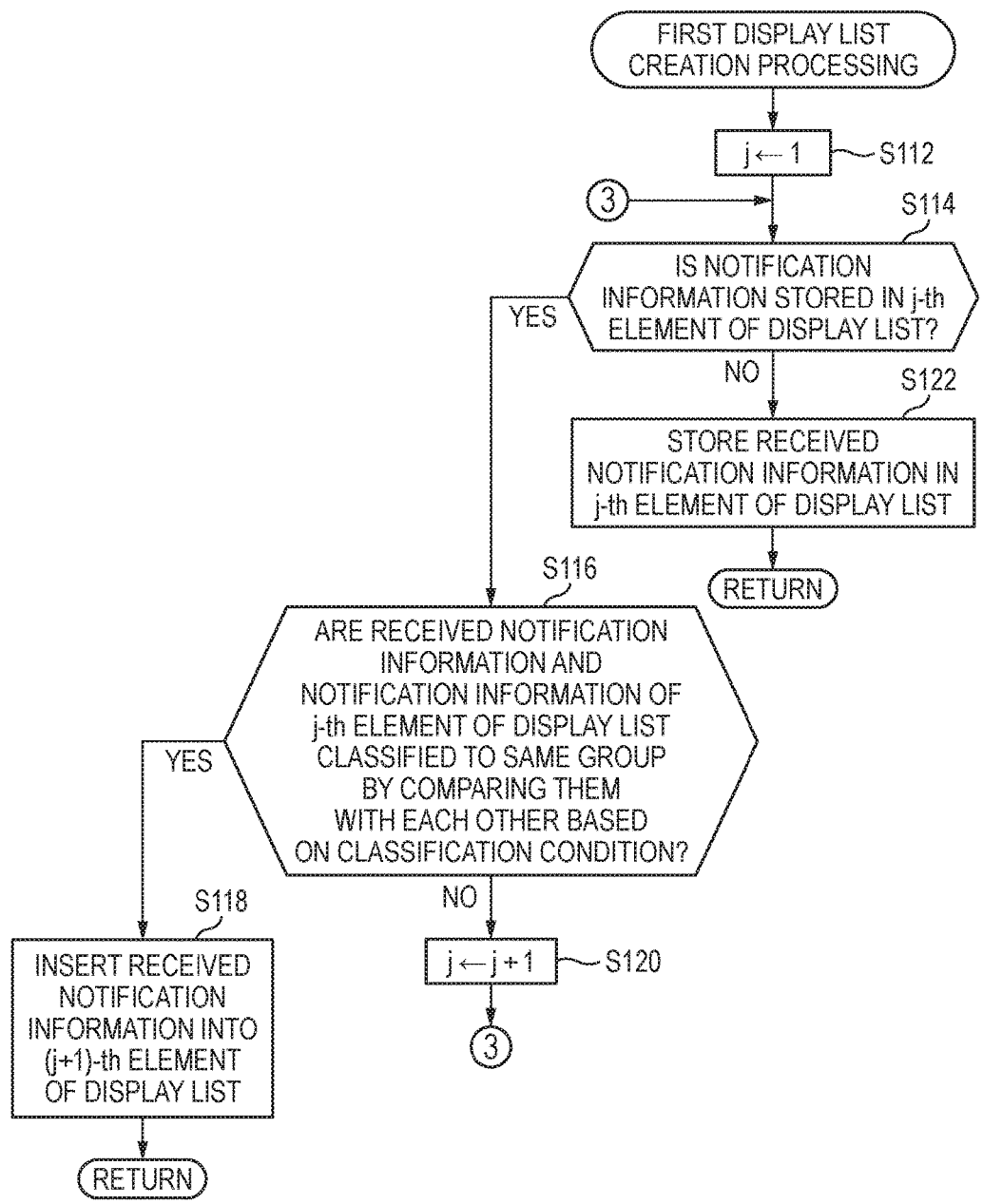
FIG. 8 is an example of a first display list creation processing.

In S122, the CPU 3 stores the notification Information M received in S100 in the j-th element of the display list 300, ends the first display list creation processing, and returns to the notification display processing of FIG. 7.

When the notification information M is classified in the display list according to the classification condition by the first display list creation processing, the notification information M classified to the same group is stored so as to be adjacent to each other. That is, in the first display list creation processing, a processing is performed to classify the notification information M to a plurality of groups.

In S108, when it is determined that the "automatic" has been set in the classification condition (S108: automatic), the CPU 3 proceeds to a classification condition decision processing illustrated in FIGS. 9A and 9B constituting FIG. 9 (S124).

Figure 5:
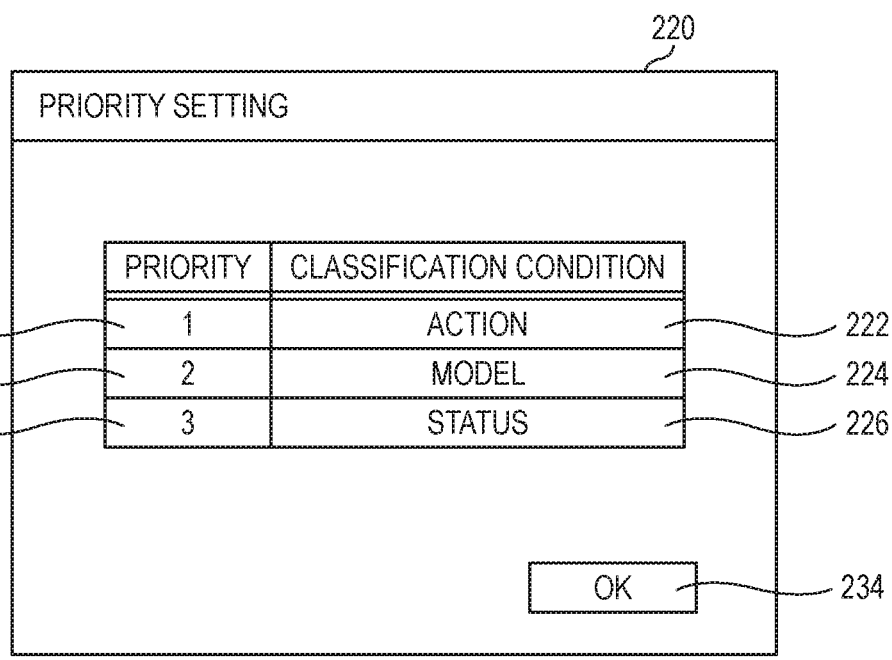
FIG. 5 is an example of a priority setting screen.

In the classification condition decision processing, an appropriate classification condition is decided based on the priorities set on the priority setting screen illustrated in FIG. 5.

In S126, the CPU 3 puts 1 into a counter "m". The counter "m" is used in order to indicate a plurality of classification conditions with set priorities.

In S128, the CPU 3 allows application flags of all the classification conditions to be "OFF". The application flag is a flag used in order to determine whether to apply the classification conditions.

In S130, the CPU 3 determines whether the counter "m" is larger than the number of classification conditions with the set priorities. In the case of negative determination in S130 (S130: No), the CPU 3 proceeds to S132.

In S132, based on a classification condition with a priority m, the CPU 3 acquires the number of groups when classifying the notification information M stored in the notification list 50. For example, a description will be provided for the case where the notification list 50 is the content illustrated in FIG. 2, the counter "m" is 1, and 1 has been set as the priority of the classification condition "action". In this case, when the notification information M1, M2, M3, and M4 stored in the notification list is grouped based on the action 106, since the notification information M1, M2, M3, and M4 is classified into two groups of the "opening folder" and the "sending by email", the CPU 3 in the present processing acquires 2 as the number of groups.

In S134, the CPU 3 determines whether the number of groups is equal to or more than 2. In the case of positive determination (S134: Yes), the CPU 3 allows the application flags to be "ON" (S136) and proceeds to S137. In the case of negative determination (S134: No), the CPU 3 proceeds to S137 without performing S136.

In S137, the CPU 3 increments the counter "m" and returns to S130. Then, the processings of S132, S134, S136, and S137 are also performed for classification conditions with priorities 2 and 3.

In the case of positive determination in S130 (S130: Yes), the CPU 3 proceeds to S138.

In S138, the CPU 3 determines the number of application flags turned into "ON". When there are no application flags turned into "ON" (S138: No), the CPU 3 decides a classification condition with the highest priority as an application classification condition, which will be used at the time of creation of the display list 300, among all the classification conditions with the set priorities (S140). When the number of application flags turned into "ON" is 1 (S138: one), the CPU 3 decides a classification condition, in which the application flags are "ON", as the application classification condition (S142). When a plurality of classification conditions are "ON" (S138: plural), the CPU 3 decides the classification condition with the highest priority as the application classification condition among the classification conditions in which the application flags are "ON" (S144).

It is possible to appropriately decide application classification conditions to be classified by the classification condition decision processing of S126, S128, S130, S132, S134, S136, S137, S138, S140, S142, and S144 in response to the content of the received notification information M.

Figure 10:
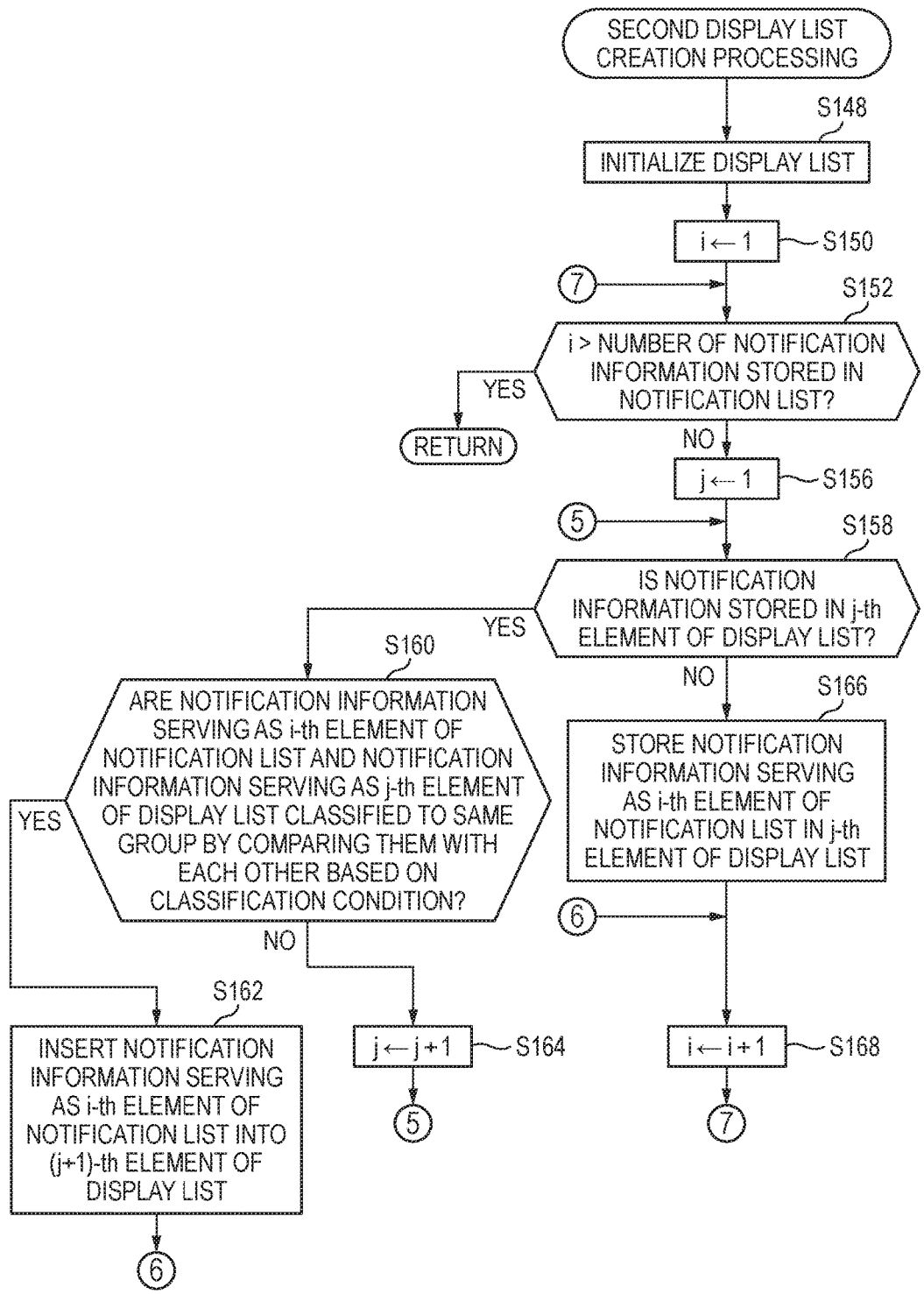
FIG. 10 is an example of a second display list creation processing.

Then, the CPU 3 ends the classification condition decision processing and proceeds to a second display list creation processing illustrated in FIG. 10 (S146).

In the second display list creation processing, based on the application classification conditions decided by the classification condition decision processing, all the notification information M stored in the notification list is newly stored in the display list 300.

In S148, the CPU 3 initializes the display list 300.

In S150, the CPU 3 puts 1 into a counter "i". The counter "i" represents a data number 101 of the notification list 50 and is used in order to indicate the notification information M to be stored in the notification list 50.

In S152, the CPU 3 determines whether the counter "i" is larger than the number of the notification information M stored in the notification list 50. In the case of negative determination (S152: No), the CPU 3 proceeds to S156.

Since processings of S156, S158, S160, S162, S164, and S166 are similar to the first display list creation processing (S112, S114, S116, S118, S120, and S122) in which the notification information M to be stored in the display list 300 is read as the notification information M which is the i-th element of the notification list 50, a description thereof will be omitted.

In S162, the CPU 3 inserts the notification information M, which is the i-th element of the notification list 50, into the (j+1)-th element of the display list 300, and then proceeds to S168.

In S166, the CPU 3 stores the notification information M, which is the i-th element of the notification list 50, as the j-th element of the display list 300, and then proceeds to S168.

In S168, the CPU 3 increments the counter "i" and returns to S152.

On the other hand, in the case of positive determination in S152 (S152: Yes), the CPU 3 ends the second display list creation processing and returns to the notification display processing of FIG. 7.

In S170, the CPU 3 displays the notification N on the display 6 of the PC 2 based on the display list 300 created by the first display list creation processing or the second display list creation processing (see FIG. 3). The notification N is displayed at the lower right of the display 6 of the PC 2 in an ascending order of the data number 301 of the display list 300. For example, when the "model" has been set in the classification condition, the notification information M is stored in the display list 300 in an order illustrated in FIG. 12. Thus, the display order of the notification N is an order of the notifications N1, N4, N2, and N3. The notification information M is classified into two groups of a group of the group name F1 "ADS-AABB" from the model 104 of the notifications N1 and N4 and a group of the group name F2 "ADS-BBCC" from the model 104 of the notifications N2 and N3. On the display 6 of the PC 2, the group name F1 "ADS-AABB", the notification N1, and the notification N4 are vertically displayed side-by-side on the image H1. Furthermore, the group name F2 "ADS-BBCC" and the notifications N2 and N3 classified into the same group are vertically displayed side-by-side on the image H2. The group name F is decided by the action 106 when the classification condition is the "action", and is decided by the status 108 when the classification condition is the "status".

Figure 6:
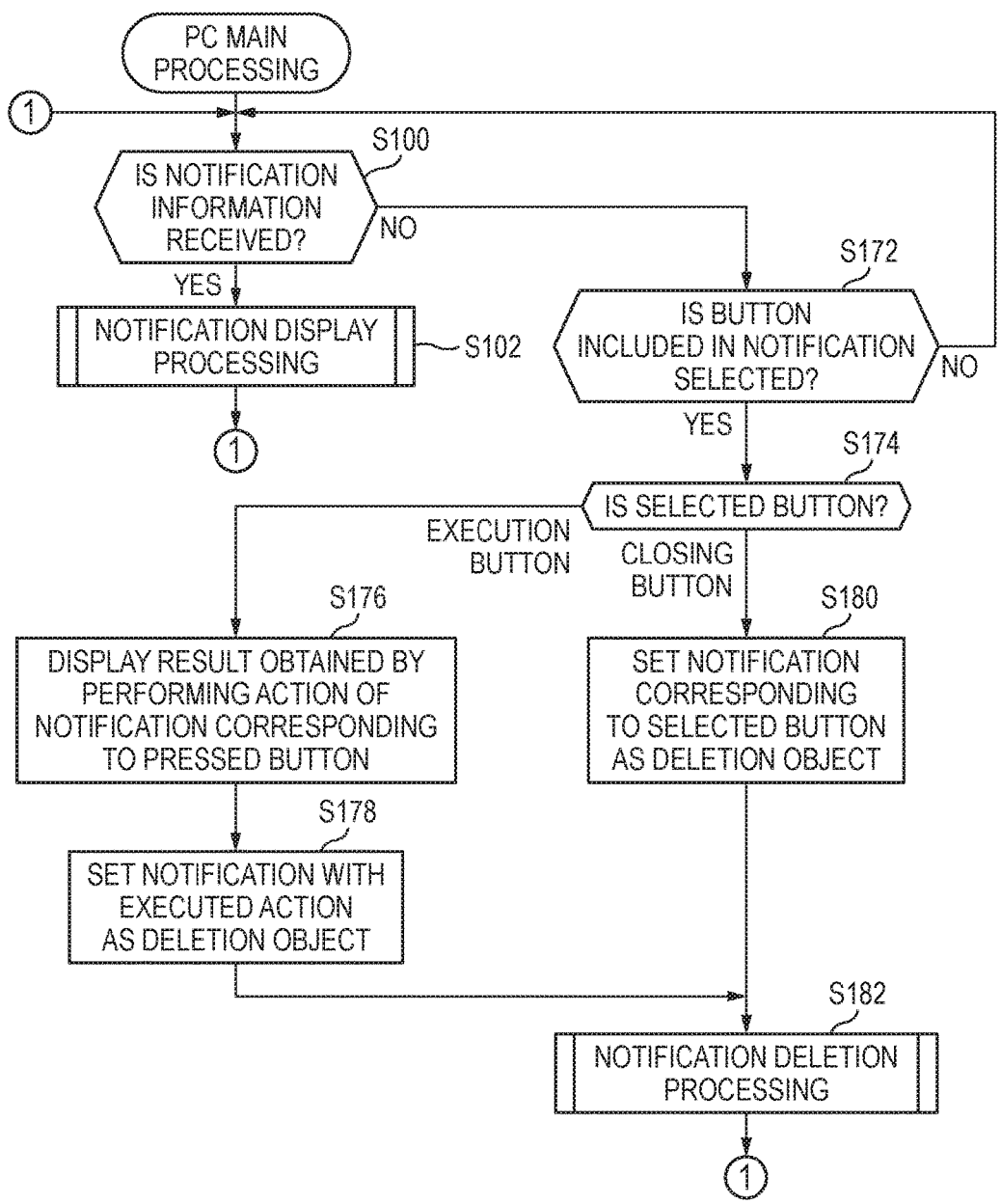
FIG. 6 is an example of a PC main processing.

Then, the CPU 3 ends the notification display processing and returns to S100 of the PC main processing of FIG. 6.

Figure 13:
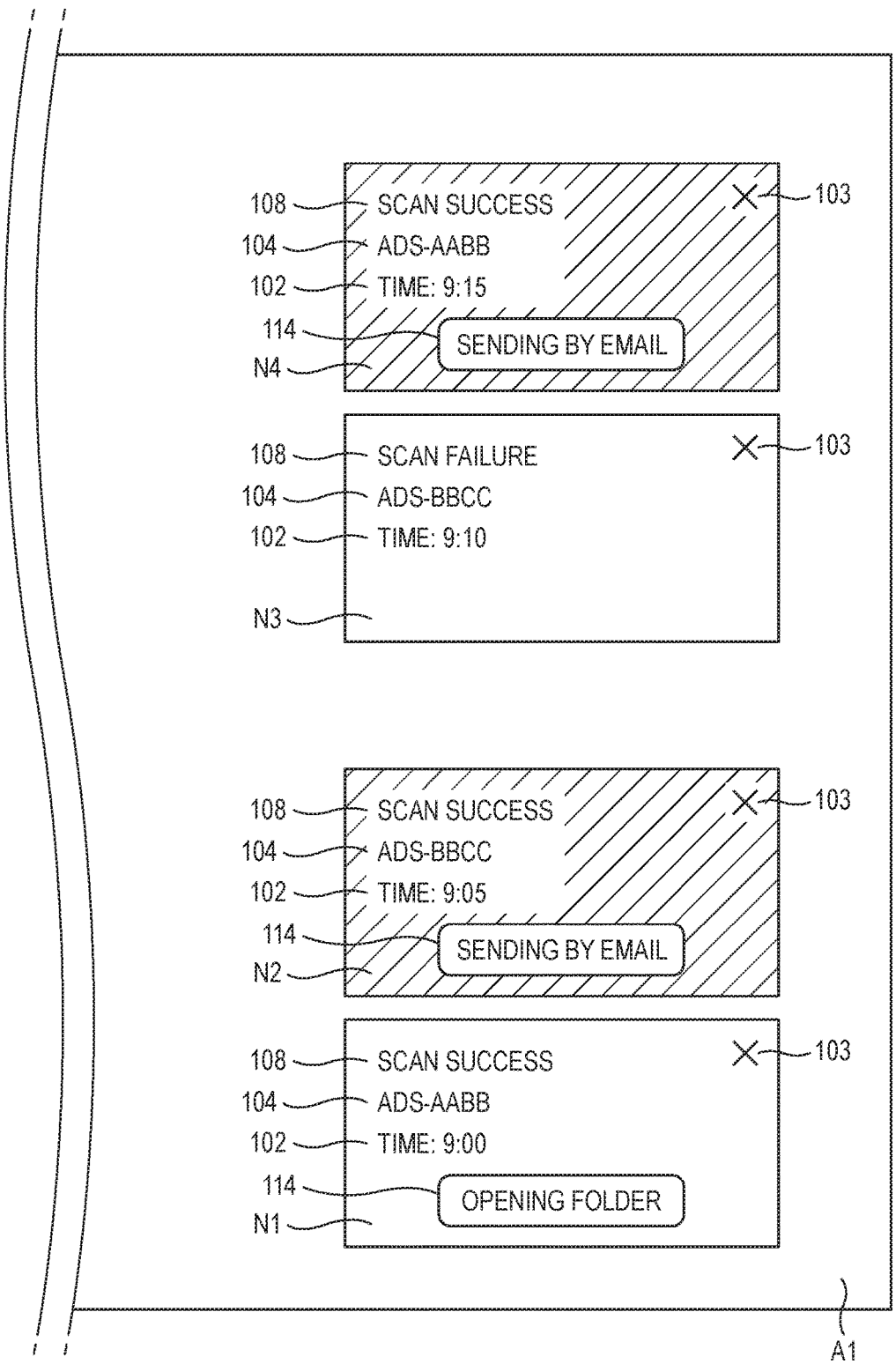
FIG. 13 is an example of a notification displayed on the display of the PC.

On the other hand, when it is determined that the "no" has been set in the classification condition in S108 (S108: no), the CPU 3 displays the notification N on the display 6 of the PC 2 based on the notification list 50 (S171). Specifically, the notification N is displayed at the lower right of the display 6 of the PC 2 in an ascending order of the data number 101 of the notification list 50. Accordingly, the notification N is displayed in an order of the time 102 (FIG. 13). Then, the CPU 3 ends the notification display processing and returns to S100 of the PC main processing of FIG. 6.

Next, a description will be provided for the case where the closing button 103 or the execution button 114 of any notification N is selected when the notification N is displayed.

In the case of negative determination in S100 (S100: No), the CPU 3 determines whether the button included in the notification N, that is, the closing button 103 or the execution button 114 is selected by a user (S172). In the case of negative determination (S172: No), the CPU 3 returns to S100. In the case of positive determination (S172: Yes), the CPU 3 proceeds to S174.

In S174, the CPU 3 determines the type of the button selected in S172. When it is determined that the execution button 114 is selected (S174: execution button) and the CPU 3 proceeds to S176.

Figure 14:
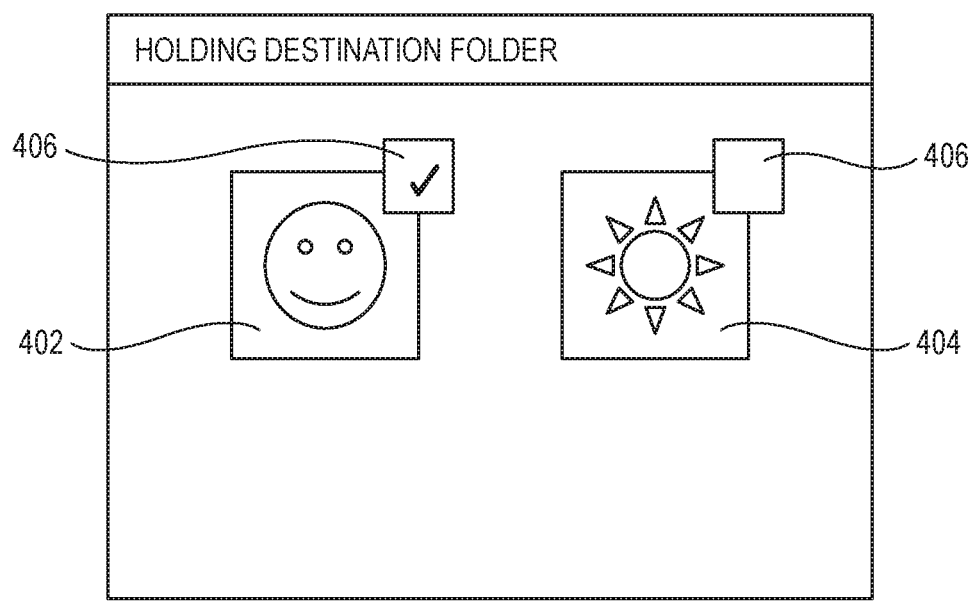
FIG. 14 is an example of an execution result of an action displayed on the display of the PC.

In S176, the CPU 3 displays a result obtained by performing the processing set by the action 106 on the display 6 with respect to the scan data held in the folder indicated by the path information 110 included in the notification information M corresponding to the selected execution button 114. In this case, when the action 106 is the "opening folder", the CPU 3 displays, on the display 6, a screen in which the scan data corresponding to the selected execution button 114 is in a selection state and the folder corresponding to the path 110 included in the notification information M is opened. This will be described in detail by using FIG. 14. FIG. 14 illustrates an example of a screen displayed when performing the "opening folder". Image data 400 and the scan data corresponding to the selected execution button 114 are held in the folder, an icon 402 corresponding to the scan data, and an icon 404 corresponding to the image data 400 are respectively displayed, and check boxes 406 are displayed at the upper right of each icon. In the step, the check box 406 of the icon 402 corresponding to the scan data included in the notification information M corresponding to the selected execution button 114 is displayed as a selected mode.

Thereafter, the CPU 3 sets the notification information M corresponding to the notification N with the executed action 106 as a deletion object (S178) and proceeds to a notification deletion processing (S182).

On the other hand, when it is determined that the closing button 103 is selected in S174 (S174: closing button), the CPU 3 sets the notification information M corresponding to the selected closing button 103 as a deletion object (S180) and proceeds to the notification deletion processing (S182).

Figure 11:
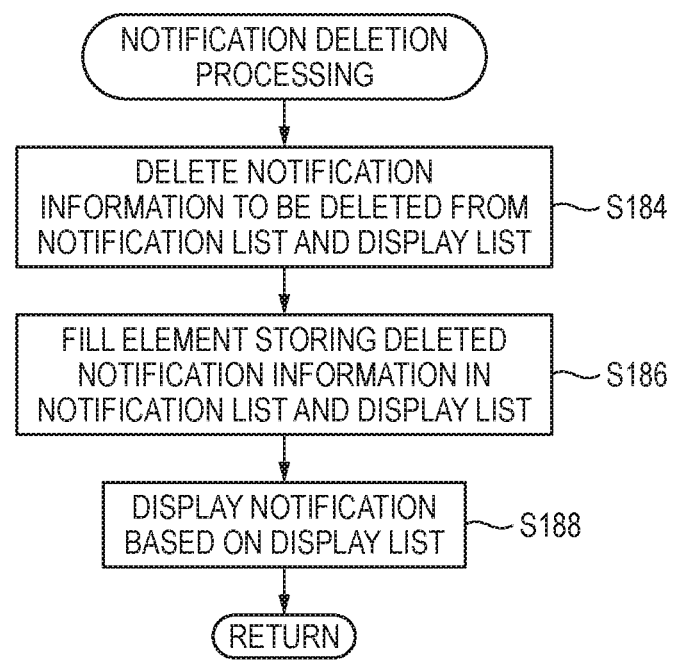
FIG. 11 is an example of a notification deletion processing.

In the notification deletion processing illustrated in FIG. 11, an area storing the notification information M to be deleted is deleted from the notification list 50 and the display list 300.

In S184, the CPU 3 deletes the notification information M to be deleted from the notification list 50 and the display list 300.

In S186, the CPU 3 fills an element storing the deleted notification information M in the notification list 50 and the display list 300. More specifically, the CPU 3 shifts a data number of notification information M having a number larger than that of the deleted notification information M to a direction in which a number is reduced. In this case, the data number is reassigned to be a sequence number from 1.

In S188, the CPU 3 displays the notification N on the display 6 of the PC 2 based on the display list 300, similarly to S170. In this case, a processing may be performed to move a notification, which is displayed on the display 6 other than a deleted notification, in a downward direction. Then, the CPU 3 ends the notification deletion processing and returns to S100 of the PC main processing of FIG. 6.

Operation and Effect of Present Embodiment

According to the aforementioned configuration, when the push scanning is performed a plurality of times, the notification including the time 102, the closing button 103, the model 104, the status 108, and the execution button 114 is displayed by the number of times of execution. Moreover, a user selects the execution button 114 of a certain notification, so that a result (an execution result of the push scanning) obtained by performing a processing set with the action 106 is displayed for scan data read by the push scanning. Accordingly, the user can recognize a notification N when executing certain push scanning and then operate the notification N to display the execution result of the push scanning, thereby easily knowing the correspondence between the push scanning instructed to be executed by the user and the execution result of the push scanning.

Furthermore, according to the aforementioned configuration, when the classification condition "no" has been set on the classification condition setting screen 200 (S108: no), the notification N is displayed in the sequence of the time 102 (S171). Accordingly, when the push scanning is performed a plurality of times, since a desired notification is easily found, user's convenience is improved.

Furthermore, according to the aforementioned configuration, the notification information M is classified according to the classification condition set on the classification condition setting screen 200 (S110), so that the notifications N are displayed side-by-side for each group (S170). Accordingly, when the push scanning is performed a plurality of times, since a desired notification is easily found, user's convenience is improved.

Furthermore, according to the aforementioned configuration, when the classification condition "automatic" has been set on the classification condition setting screen 200 (S108: automatic), the application classification condition is decided based on a preset priority and the content of received notification information M (S124), and the notifications N are classified for each group (S146) and are displayed side-by-side for each group (S170). Accordingly, the application classification condition can be decided based on the preset priority and the content of the received notification information M and the notifications N can be displayed side-by-side according to the application classification condition, so that user's convenience is improved.

Furthermore, according to the aforementioned configuration, the group name F for identifying each group, is displayed together with the notifications N displayed side-by-side for each group. Accordingly, when the push scanning is performed a plurality of times, since a desired notification is easily found, user's convenience is improved.

Furthermore, according to the aforementioned configuration, the notification information M is classified into groups according to the display color classification condition set on the classification condition setting screen 200, and the notification N is displayed with colors different for each group. Accordingly, when the push scanning is performed a plurality of times, since a desired notification is easily found, user's convenience is improved.

Furthermore, according to the aforementioned configuration, when the action 106 is the "opening folder", a folder, in which scan data corresponding to the notification N with the selected execution button 114 is in a selected mode, is displayed (S176). Accordingly, image data, which is a result obtained by performing the push scanning, is easily found from a plurality of pieces of image data, so that user's convenience is improved.

Modification Example

Figure 15:
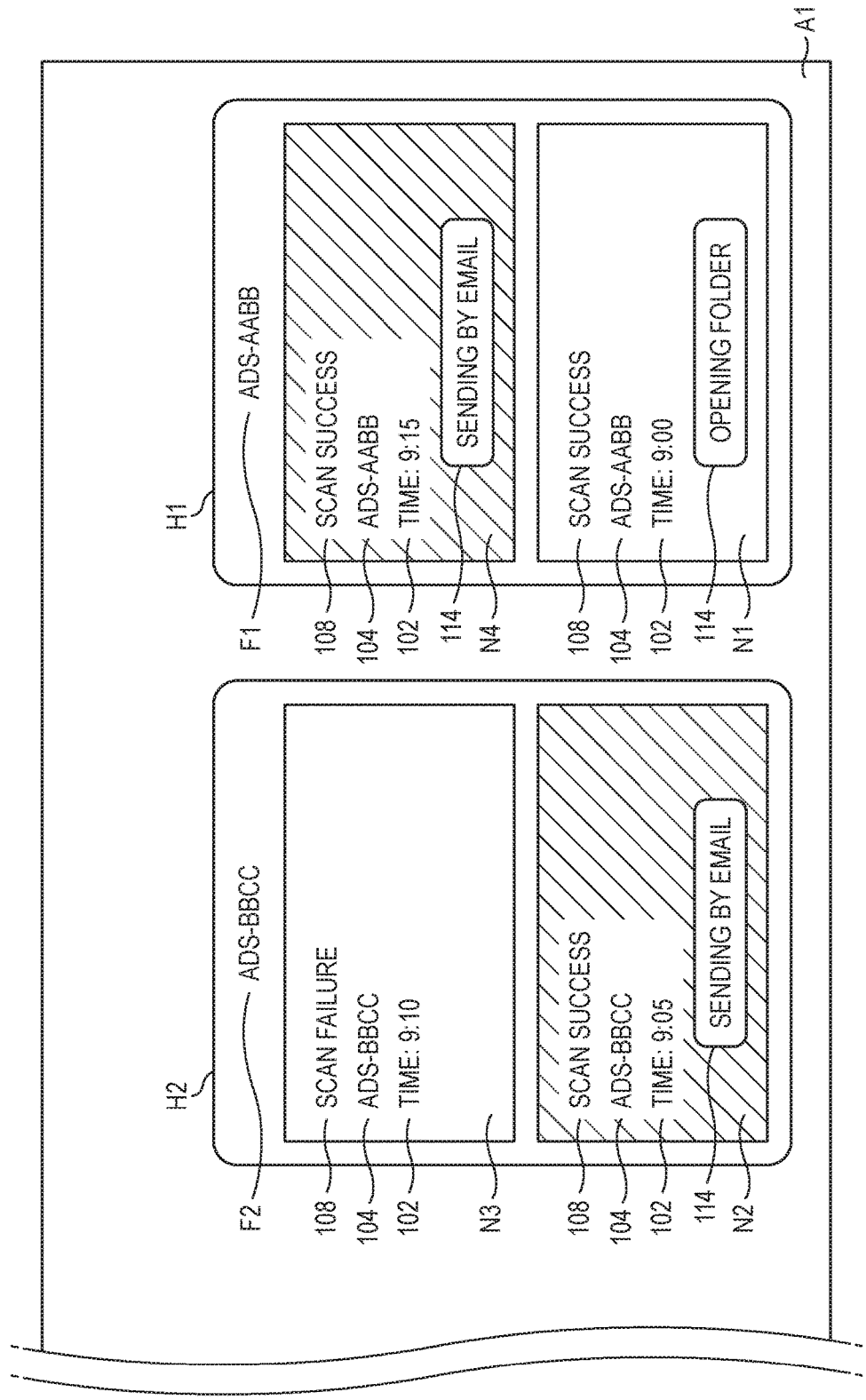
FIG. 15 is an example of a notification displayed on the display of the PC.

In the present embodiment, the notifications are displayed side-by-side in an up and down direction in S170; however, the notification may be displayed side-by-side in a right and left direction for each group. More specifically, the notification is displayed at the lower right of the display 6 of the PC 2 in an ascending order of the data number 301 of the display list 300. When notifications N classified to different groups are displayed, display places of the notifications N are shifted in the left direction and notifications N classified to the same group are displayed side-by-side. The notification N2, the notification N3, and the group name F2 are vertically displayed side-by-side on the image H2 at the left side of the group name F1, the notification N1, and the notification N4 displayed with overlapping on the image H1 so as not to overlap the image H1 (see FIG. 15).

In this way, when the push scanning is performed a plurality of times, a desired group is easily found and thus a desired notification N is easily found, so that user's convenience is improved.

In the present embodiment, the execution result of the action 106 corresponding to the notification N is displayed on the display 6 by the selection of the execution button 114 included in the notification N; however, this disclosure is not limited thereto. For example, the notification N may not include the execution button 114 and may be clicked with a mouse, so that the execution result of the action 106 corresponding to the notification N may be displayed on the display 6.

Furthermore, in the present embodiment, the CPU 3 simultaneously receives read scan data, the time 102, the model 104, the action 106, and the status 108 as the notification information M; however, these may be received a plurality of number of times. Furthermore, after the execution of the push scanning is instructed in the scanner 20, the execution instruction may be notified to the PC 2, and after the PC 2 may transmit a scanning start command to the scanner 20, scanning may be executed, so that various types of information may be transmitted to the PC 2.

Furthermore, in the present embodiment, a time, at which the execution of the push scanning is instructed, that is, a time decided by the scanner 20 is set as the time 102; however, alternatively, the time may be a time at which the PC 2 transmits the aforementioned scanning start command to the scanner 20 or receives scan data. That is, the time may be a time decided by the scanner 20.

The scanner 20 is an example of an image reading apparatus. The PC 2 is an example of an information processing apparatus. The action 106 is an example of designation information. The time 102, the model 104, the action 106, and the status 108 are an example of specific information, wherein the specific information is information including at least the time 102. The group name F is an example of identification information. A first classification condition is an example of the classification condition and a second classification condition is an example of the display color classification condition.

Furthermore, in the present embodiment, the notification N based on the display list 300 is displayed at the lower right of the display 6; however, the display position of the notification N is not limited thereto. For example, the notification N may be displayed sequentially from the upper right.

Furthermore, in the present embodiment, the notification list 50 and the display list 300 are separately provided; however, these may be one list.

S100 is an example of a first acquisition processing. S170 and S171 are an example of a first display processing. S176 is an example of a second display processing. S110 is an example of a first classification processing. S132 is an example of a second acquisition processing. S134 is an example of a determination processing. S138, S140, S142, and S144 are an example of a decision processing. S416 is an example of a second classification processing. S106 is an example of a third classification processing. S104 is an example of a storage processing.

What is claimed is:

1. A non-transitory computer-readable storage medium having instructions executable by a computer of an information processing apparatus including a memory, a display, an operation interface, and a communication interface communicable with an image reading apparatus having a push scanning function,
wherein the instructions, when executed by the computer, cause the information processing apparatus to perform:
acquiring, through the communication interface, image data, which is read by the image reading apparatus, designation information for designating a processing of the image data, and specific information for specifying an instruction causing the image reading apparatus to perform push scanning;
displaying, on the display, a notification including the specific information, the notification indicating that the image data, the designation information and the specific information have been acquired;
displaying, on the display, a result obtained by performing a processing of the image data designated by the designation information, in response to receiving an operation to the notification via the operation interface; and
displaying, on the display, a second notification together with a first notification, in a case where second image data, second designation information, and second specific information are acquired during displaying of the first notification indicating that a first image data, a first designation information and a first specific information are acquired, the second notification indicating that the second image data, the second designation information and the second specific information are acquired.

2. The non-transitory computer-readable storage medium according to claim 1,
wherein the specific information includes time information regarding the push scanning function.

3. The non-transitory computer-readable storage medium according to claim 2,
wherein the notifications are chronologically displayed side-by-side based on the time information regarding the push scanning function.

4. The non-transitory computer-readable storage medium according to claim 1,
wherein the instructions, when executed by the computer, further cause the information processing apparatus to perform
displaying the notification with including an execution button for accepting an operation of instructing execution of the processing designated by the designation information with respect to the image data.

5. The non-transitory computer-readable storage medium according to claim 1, wherein the instructions, when executed by the computer, further cause the information processing apparatus to perform:
accepting an operation to designate a first classification condition serving as a classification reference of the notification, via the operation interface; and
classifying the notification into groups based on the accepted first classification condition,
wherein the notifications are displayed side-by-side for each group.

6. The non-transitory computer-readable storage medium according to claim 5,
wherein the first classification condition is a condition for classifying the designation information or the specific information.

7. The non-transitory computer-readable storage medium according to claim 5,
wherein identification information for identifying each of the groups is displayed together with the notifications that are displayed side-by-side for each group.

8. The non-transitory computer-readable storage medium according to claim 5,
wherein the notifications of the same group are displayed side-by-side in a first direction, and the notifications are displayed side-by-side for each group in a second direction different from the first direction.

9. The non-transitory computer-readable storage medium according to claim 1, wherein the instructions, when executed by the computer, further causing the information processing apparatus to perform:
accepting an operation of designating a priority corresponding to each of a plurality of first classification conditions serving as a classification reference of the notification, via the operation interface;
acquiring the number of groups classifying the notification according to each of the first classification conditions;
determining whether the acquired number of groups is two or more;
wherein
in a case where the number of the first classification conditions, by which the number of groups is determined to two or more by the determining, is one, the first classification condition, by which the number of groups is determined to two or more, is decided as an application classification condition,
in a case where the number of the first classification conditions, by which the number of groups is determined to two or more by the determining, is plural, a corresponding classification condition with a highest priority of the plurality of first classification conditions is decided as the application classification condition, and
in a case where there is no first classification condition, by which the number of groups is determined to two or more, a corresponding first classification condition with a highest priority of the plurality of first classification conditions is decided as the application classification condition; and classifying the notification into a plurality of groups according to the decided application classification condition, wherein the notifications are displayed side-by-side for each group.

10. The non-transitory computer-readable storage medium according to claim 1, further causing the information processing apparatus to perform:

accepting an operation of designating a second classification condition being information serving as a classification reference of the notification via the operation interface; and classifying the notification into a plurality of groups according to the second classification condition, wherein the notification is displayed with colors different for each group.

11. The non-transitory computer-readable storage medium according to claim 1, wherein the instructions, when executed by the computer, causing the image processing apparatus to perform storing the acquired image data acquired in a predetermined folder of the memory; and displaying a result obtained by opening the predetermined folder in a case where the processing designated by the designation information is a processing of opening the predetermined folder storing the image data, based on an operation to the notification via the operation interface, wherein, the image data, which is included in the predetermined folder and is corresponding to the operated notification, is displayed under selected condition.

12. An information processing apparatus comprising:
a display;
an operation interface;
a communication interface communicable with an image reading apparatus having a push scanning function; and
a controller configured to:

acquire image data, through the communication interface, image data, which is read by the image reading apparatus, designation information for designating a processing of the image data, and specific information for specifying an instruction causing the image reading apparatus to perform push scanning;

display, on the display, a notification including the specific information, the notification indicating that the image data, the designation information and the specific information have been acquired;

display, on the display, a result obtained by performing a processing of the image data designated by the designation information, in response to receiving an operation to the notification via the operation interface; and display, on the display, a second notification together with a first notification, in a case where second image data, second designation information and second specific information are acquired during displaying of the first notification indicating that a first image data, a first designation information and a first specific information are acquired, the second notification indicating that the second image data, the second designation information and the second specific information are acquired.

13. A non-transitory computer-readable storage medium having instructions executable by a computer of an information processing apparatus including a memory, a display, an operation interface, and a communication interface communicable with an image reading apparatus, wherein, the instructions, when executed by the controller, cause the information processing apparatus to perform:

acquiring, through the communication interface, first image data, first designation information and first specific information, the first image data being read by the image reading apparatus based on a first instruction, the first designation information designating a first processing of the first image data, the first specific information specifying the first instruction, the first instruction causing the image reading apparatus to perform a push scanning;

displaying, on the display, a first notification including the first specific information, the first notification indicating that the first image data, the first designation information and the first specific information are acquired;

acquiring, through the communication interface, second image data, second designation information and second specific information, the second image data being read by the image reading apparatus based on a second instruction, the second designation information designating a second processing of the second image data, the second specific information specifying the second instruction, the second instruction causing the image reading apparatus to perform the push scanning;

displaying, on the display, a second notification including the second specific information, the second notification indicating that the second image data, the second designation information and the second specific information are acquired;

receiving, via the operation interface, an operation to at least one of the first notification and the second notification;

performing a first processing designated by the first designation information in a case an operation to the first notification is received;

performing a second processing designated by the second designation information in a case an operation to the second notification is received;

displaying, on the display, at least one of a first result and a second result, the first result being obtained by performing the first processing, the second result being obtained by performing the second processing, and wherein both the first notification and the second notification are displayed simultaneously on the display.

* * * * *